Nov. 3, 1959  C. S. WHITE  2,911,270
FLEXIBLE LOW FRICTION PISTON
Filed May 31, 1957

INVENTOR.
Charles S. White.
BY
Harness, Dickey & Pierce
ATTORNEYS.

United States Patent Office 2,911,270
Patented Nov. 3, 1959

2,911,270
FLEXIBLE LOW FRICTION PISTON
Charles S. White, Birmingham, Mich.
Application May 31, 1957, Serial No. 662,615
8 Claims. (Cl. 309—23)

This invention relates to pistons and, particularly to a piston of the low friction, flexible, spherical type.

Difficulty has always been experienced when attempting to obtain a proper engagement between pistons and cylinders to produce a seal therefor. Usually the material loses its resiliency, or flexibility, becomes warped or for many other reasons becomes inefficient as a seal after a predetermined length of time and number of operations.

The present invention pertains to a piston which preferably is of semispherical shape, of thin wall, flexible construction, having an inner layer of body material and an outer layer of low friction material. In one form the outer layer may be of clothlike material woven from Teflon threads or other low friction material, having in the back face threads of bondable material woven therein. Such threads may be cotton, wool, resins or may be of glass fibers when the piston is subject to high temperatures in the range of 500° F. The inner layer or body is preferably a woven cloth which has been treated with a phenolic resin and bonded to the bondable threads of the Teflon outer layer. Preferably, sufficient resin material is applied to the inner layer of cloth material to produce the bond with the bondable threads of the outer layer, but not sufficient to cause the resin material to pass through the woven outer layer. Sheets of the cloth layers are first bonded together in lengths, and pieces are cut therefrom and drawn into the semispherical shape in a manner as illustrated, described and claimed in the copending application of Charles S. White, Serial No. 619,782, filed November 1, 1956 for Elements Having Low Friction Pressure Engagement and Method of Construction. The diameter of the sphere is slightly larger than the diameter of the cylinder in which the piston is to operate so as to provide a pressure engagement initially therebetween. A rod is placed upon the center of the hemispherical piston if pressure in a single direction is to be produced, such as in an air pump, or two like semispherical elements may be placed back to back and secured together on the rod to provide a double-acting piston, effective in both directions of reciprocal operation. The piston may be constructed to have a cylindrical body portion from which the spherical lip section extends to simulate the outer section of the hemispherical piston above described.

Accordingly, the main objects of the invention are: to provide a piston for a cylinder made from a semispherical flexible element having a low friction characteristic on the outer surface; to mount two flexible semispherical elements on the end of the piston rod to form a double-acting piston when placed within a cylinder; to mold a piston from an outer material of low friction characteristic and an inner material which is bonded thereto to provide a flexible lip portion on an outer spherical section which is supported by a rigid cylindrical portion, and, in general, to provide a piston of spherical section which is flexible so that the pressure thereon will increase the sealing power, all of which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein.

Figure 1:
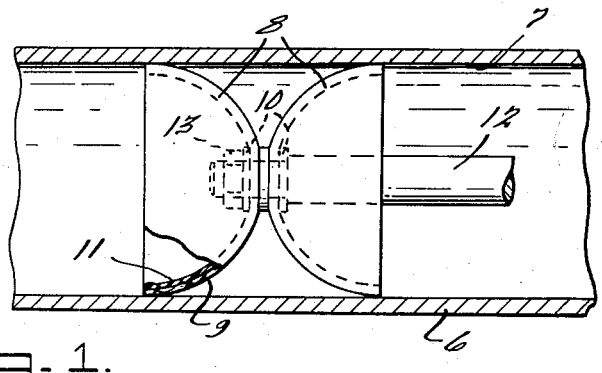
Figure 1 is a sectional view of a cylinder having a pair of semispherical pistons therein embodying features of the present invention.

Referring to Fig. 1, a cylinder 6, of conventional form, has an inner surface 7 which is highly polished as it forms the surface engaged by a piston herein illustrated as a pair of semispherical elements 8 of like construction. Each element 8 as herein illustrated by way of example, is flexible, made of two layers of woven cloth, an outer layer 9 which is made of threads of Teflon, or like fluorocarbon resin, having bondable cords woven on the inner side thereof, as illustrated, described and claimed in the copending application of C. S. White, Serial No. 544,945, filed November 4, 1955, now Patent No. 2,804,886, for Low Friction Fabric Material. An inner layer 11 is first treated with a phenol or like resin and after treatment is bonded to the bondable cords on the rear face of the woven low friction fabric 9. Only sufficient of the phenolic resin material is retained on the layer 11 to produce the bond with the bondable cords of the material 9 and none will pass through the outer layer.

The joined layers of material are then cut to desired size and drawn over a spherical mandrel to produce the elements 8, two of which are illustrated as being mounted on a piston rod 12. A washer 10, is placed between the two pistons 8, and a similar washer is placed on the inner side of the pistons on the reduced diameter portion of the rod. The washers and pistons are retained in fixed locked relationship by a nut 13, which is screwed upon the thread on the reduced end of the rod. The diameter of the hemisphere shaped pistons 8, are slightly greater than the diameter of the polished surface 7 of the cylinder 6 so that a tight fit is maintained between the lips of the pistons 8 and the surface 7. An initial seal is provided by pressure engagement of the lips of the pistons with the polished cylinder wall. This sealing pressure is increased as pressure builds up on the fluid, due to the piston movement.

The outer Teflon layer has a low friction engagement with the surface 7 of the cylinder, and substantially eliminates heat and wear. After the material is cured, the piston will not shrink, change its form or become hard and is, therefore, substantially indestructible. When the piston is to be subjected to heat, the layer 11 may be woven from glass threads and, as a result, the two layers 9 and 11 will withstand more than 500° F. without any deleterious effects occurring thereto. Any fibers may be employed in the material forming the layer 11 so long as they are readily bondable. Preferably both layers are thin so that the combined layers when drawn into semispherical shape are approximately $\frac{1}{32}''$ in thickness and are flexible but rigid enough to initially provide a seal with the wall of the cylinder.

Figure 2:
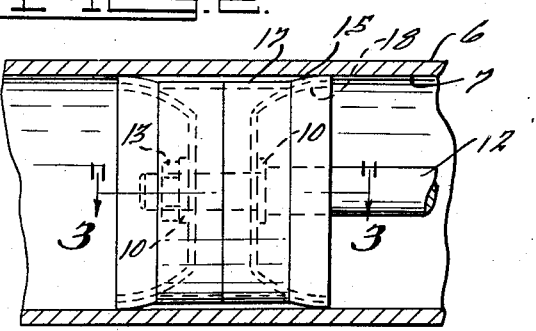
Fig. 2 is a view of structure similarly illustrated in Fig. 1 showing another form of the invention.
Figure 3:
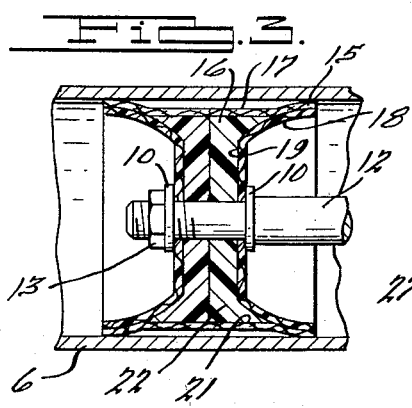
Fig. 3 is a sectional view of structure illustrated in Fig. 2, taken on the line 3—3 thereof.

In Fig. 2, another form of piston is illustrated having an outer section 15 of spherical form similar to the outer section of the hemispherical piston 8. The inner section 16 of the piston is of cylindrical shape, the peripheral portion of the cylindrical and spherical sections comprising a layer of the low friction cloth 17. The cloth 17 is placed within a mold in engagement with an inner layer of resin-treated woven cloth 18, the layers being bonded together to form the flexible spherical section. The cloth 18 is extended across the opening of a mold, as at 19, so that the area 21 within the cloth layers and mold may be filled with a resin 22 which forms the cylindrical body portion 16 with the flexibly spherical section 15 extending therefrom. The piston rod 12 may be attached to a single piston or to a pair of pistons as illustrated in Figs. 2 and 3. The pistons are secured together on the threaded end of the rod 12 by the nut 13. The spherical section 15 of the piston functions in the same manner as the similar section of the piston 8 and similarly provides an indestructible piston having a sealing end section.

Figure 4:
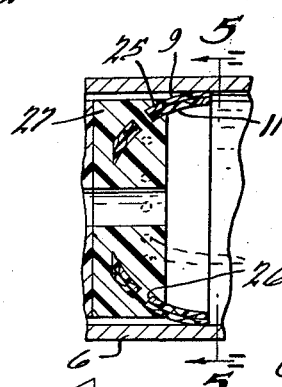
Fig. 4 is a view of structure similarly illustrated in Fig. 3 showing another form thereof.
Figure 5:
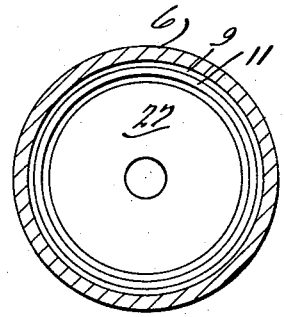
Fig. 5 is a sectional view of the structure illustrated in Fig. 3, taken on the line 5—5 thereof.

In Figs. 4 and 5 a piston is illustrated, constructed from a section 25 of the piston 8 which has been provided with apertures 26. A cylindrical portion 27 is molded from a resin material to the inner and outer surface of the section 25. Since the low friction material, such as Teflon, will not bond to the resin material forming the cylinder portion 27, the apertures 26, permit the inner and outer portions of the material to be joined together. The resulting piston functions in the same manner as the piston 8 to provide an initial seal having low friction engagement with the cylindrical wall.

What is claimed is:

1. A piston for operation within a cylinder, said piston having a hollow semispherical shape and a wall of like construction and of uniform thickness terminating in a circular edge, the wall having an outer layer of low friction fabric material secured to a relatively thin inner layer of hardened resin material to provide rigidity normal to a plane defined by the edge and flexibility laterally in said plane.

2. A piston for operation within a cylinder, said piston having a hollow semispherical shape and a wall of uniform like construction and of thickness terminating in a circular edge, the wall having rigidity normal to a plane in the edge and being flexible laterally in said plane, said wall having an inner layer of material secured to an outer layer of material, said outer layer of material having low friction characteristics.

3. A piston for operation within a cylinder, said piston having a hollow semispherical shape and a wall of uniform thickness terminating in a flexible annular edge, said wall having at least two layers of material, the outer layer of material being a cloth woven from nonbondable low friction resin threads having on the inner face bondable cords woven therein, and a resin bonding the adjacent layer of material to the inner bondable cords, said layers being of uniform section throughout the semispherical area.

4. The combination with a cylinder, of a piston therein of semispherical shape and of thin wall construction providing rigidity along the wall and flexibility laterally of the circular edge, said wall having an outer layer of low friction material secured to an inner layer of resin material of uniform thickness, securing means in the central portion of the piston, and a rod supporting said piston when disposed normal to a plane through the circular edge and attached to said securing means.

5. The combination with a cylinder, of a piston therein of central cylindrical shape having truncated semispherical shaped thin wall lip portions at opposite ends providing rigidity at the central wall portion and flexibility at the lip portions at the opposite ends of the central portion, a rod secured to said central portion and extending from one of said end portions.

6. A piston having a cylindrical body portion from which a flexible lip portion of uniform material and thickness extends of the shape of a section of a sphere, said lip portion of said spherical section having an outer engaging face of low friction resin material.

7. A piston having a cylindrical body portion from which a flexible lip portion extends of the shape of a section of a sphere, said spherical section having an outer engaging face of low friction cloth material, and a reinforcing cloth layer bonded to the inner side of the material forming said face.

8. In a piston construction, two layers of woven material of different frictional characteristics, and bonding material retaining said layers together which when the adhered layers are shaped to semispherical form provides rigidity thereto while permitting the annular edge portion to deform from a circular shape.

References Cited in the file of this patent

UNITED STATES PATENTS

| | | |
|---|---|---|
| 1,215,445 | Waller | Feb. 13, 1917 |
| 2,298,584 | Onions | Oct. 13, 1942 |
| 2,388,520 | Bowie | Nov. 6, 1945 |

OTHER REFERENCES

Wall Street Journal, published May 11, 1956, Top of columns 5 and 6 on page 2.